United States Patent [19]

Shelly

[11] 4,425,613
[45] Jan. 10, 1984

[54] FORCED LOAD SHARING CIRCUIT FOR INVERTER POWER SUPPLY

[75] Inventor: Randolph D. W. Shelly, Rosemere, Canada

[73] Assignee: Sperry Corporation, New York, N.Y.

[21] Appl. No.: 266,718

[22] Filed: May 26, 1981

[51] Int. Cl.³ .............................................. H02P 13/22
[52] U.S. Cl. ......................................... 363/26; 363/71
[58] Field of Search .......................... 363/16, 17, 19, 21, 363/23, 25, 26, 28, 37, 69–71, 80; 323/269, 272

[56] References Cited

U.S. PATENT DOCUMENTS

| | | | |
|---|---|---|---|
| 2,775,733 | 12/1956 | Winograd | 363/69 |
| 3,621,365 | 11/1971 | Beck | 363/71 |
| 4,149,233 | 4/1979 | Frosh et al. | 363/71 |
| 4,276,590 | 6/1981 | Hansel et al. | 363/71 |
| 4,338,658 | 7/1982 | Toy | 363/17 |
| 4,359,679 | 11/1982 | Regan | 363/26 |

FOREIGN PATENT DOCUMENTS 933978  8/1963  United Kingdom ................. 363/70

Primary Examiner—William H. Beha, Jr.
Attorney, Agent, or Firm—Howard P. Terry

[57] ABSTRACT

A power supply system that utilizes a plurality of inverter power supplies connect in common to drive a common load with control circuitry for forcing the power supplies to share the load equally is described. Control circuitry associated with each inverter power supply senses the current level provided to the load and compares to the average current provided by all other power supplies in the system. The control circuitry includes circuitry for controlling the pulse width modulator circuitry in response to the sensed condition that the power supply is supplying more than its equal share of the load and causes it to adjust the duty cycle of power switches in the power supply downward to reduce the output current level.

11 Claims, 5 Drawing Figures

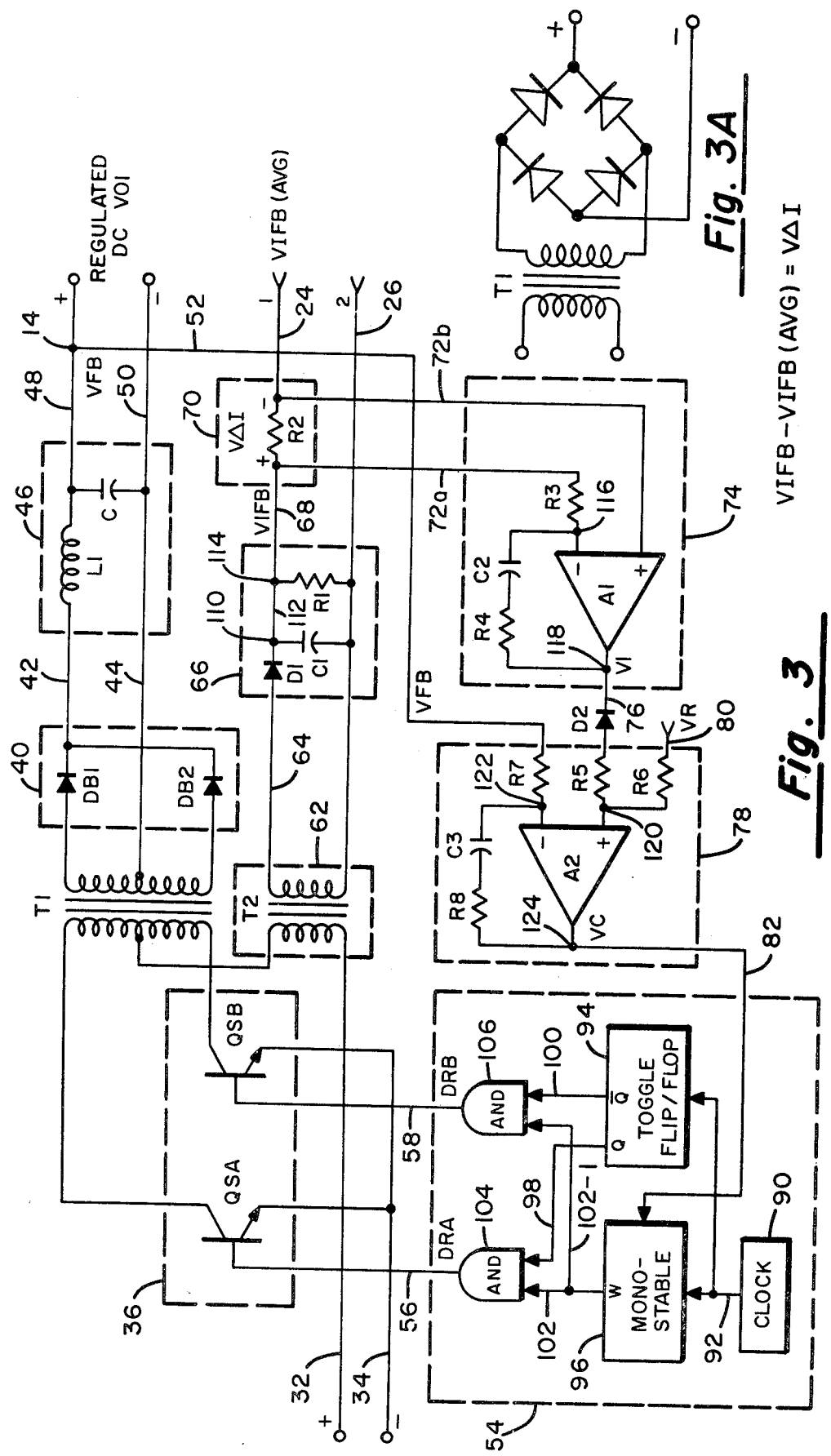

FORCED LOAD SHARING CIRCUIT FOR INVERTER POWER SUPPLY

BACKGROUND OF THE INVENTION

This invention relates generally to the field of power supply circuits, and more particularly to a system for causing equal sharing of the load by a plurality of power supplies electrically connected thereto.

It is known in the prior art that it is often advantageous to provide a plurality of power supplies to drive a particular load rather than to design and construct a single power supply for that purpose. These advantages come from several sources, such as being able to utilize readily available components rather than requiring power components that may be unduly expensive or unavailable in the present art. There is an advantage in being able to design and construct standardized individual power supply units that can then be selected and utilized in a number for driving a load under consideration. Also, a margin of safety can be designed into such a system by providing more power supply units then would normally be required in order to accommodate failures in individual supplies. There are of course more and varied detailed advantages in such multiple power supply systems, but prior art systems are not without problems.

It has been common in the prior art systems that involve the use of multiple power supplies to drive a given load, to operate the power supplies in a current limit mode. This mode of operation results in the individual power supplies being operated at their maximum power output capacity, with only one power supply making up the balance of the power required for the particular load. For example, if a particular load had six power supplies coupled to it and the output capacity of four of the power supplies operating at maximum output is not quite sufficient to drive the load, four of the power supplies would be operated at maximum capacity with the balance of the load supplied by the fifth power supply. In such a configuration the sixth power supply would not be operative and would be idle. In such a system, if the load were variable and would increase beyond the capacity of the fifth power supply when added to the four power supplies operating at maximum capacity, the sixth power supply would then be brought into operation to supply the balance of the load. Of course it is apparent that the system must be designed such that the maximum load that can be encountered can be supplied by the number of power supplies available.

It has been found that this type of multiple power supply configuration results in unequal stress on the power supplies since some of the power supplies will be operating at maximum capacity at all times, some of the power supplies will be operative at varying capacities depending upon load requirements, and some of the power supplies may be inoperative for long periods of time. This uneven stress operation tends to result in a higher supply failure rate for those power supplies that are operated at maximum capacity for the greatest length of time. Further, systems of that type exhibit a poor response that can be very disruptive to the load when a power supply that is supplying current to the load fails.

SUMMARY OF THE INVENTION

With the foregoing background in mind, this invention provides a system to force a number of power supplies whose outputs are connected to drive a common load, to share the load current equally.

A plurality of power supplies have individual output terminals coupled in common respectively to drive the associated load. Each power supply has associated with it, circuitry that senses the current level of the power supply and circuitry for comparison to the average of current levels being supplied by all power supplies in the system. When it is determined that a particular power supply is supplying more than the average current level, an error signal will be generated. The error signal will be utilized by control circuitry to alter the output level of the power supply and thereby cause it to approach an operational level where it will be providing a current level comparable to that of the average of all power supplies in the system.

The power supply utilizes switching transistors that provide signals through a coupling transformer to a rectifier network. The output of the rectifier network is filtered and provided as a regulated DC output to the load. The output voltage is sampled and provided as a voltage feedback for comparison purposes. At the same time, a current signal from the inverter power supply is sampled by a transformer-coupled current detector and produces a signal proportional to the output current of the power supply. The sensed current level is converted to a voltage which is compared to the average feedback voltage of all power supplies in the system. When it is determined that the sensed current level, as indicated by the converted voltage level, exceeds the average, control circuitry provides a control voltage level that functions through pulse-width-modulator circuitry to alter the operation of the switching transistors to reduce the duty cycle, and thereby reduce the current supplied by the power supply to the load.

OBJECTS

A primary object, then, of the invention is to provide an improved power supply system wherein a number of power supplies, whose outputs are connected in common to drive a load, are forced to share the load current equally.

Yet another object of this invention is to provide a system for sensing the current level of each power supply in a multiple power supply system, and provide comparison to the average current output of each supply for providing control of the power supply to cause reduction of the current output when it is sensed that the power supply is providing more than the average current for all supplies coupled to the common load.

Still a further object of the invention is to provide circuitry for altering the duty cycle of an inverter power supply to reduce the output current when it is detected that the power supply is providing more than the average of the currents provided by all power supplies coupled to the common load.

Yet another object of the invention is to provide a system for providing control signals that will control pulse-width-modulation circuitry for controlling the duty cycle of an inverter power supply when it is sensed that the current provided by the power supply is greater than the average current provided by all power supplies coupled to a common load in the system.

BRIEF DESCRIPTION OF THE DRAWINGS

FIG. 3 is a circuit and logic diagram and is a schematic illustration of a power supply and the control circuitry of the present invention;

FIG. 3A is a schematic diagram of a bridge rectifier circuit which may be used in the circuit of FIG. 3;

DESCRIPTION OF THE PREFERRED EMBODIMENT

Figure 1:
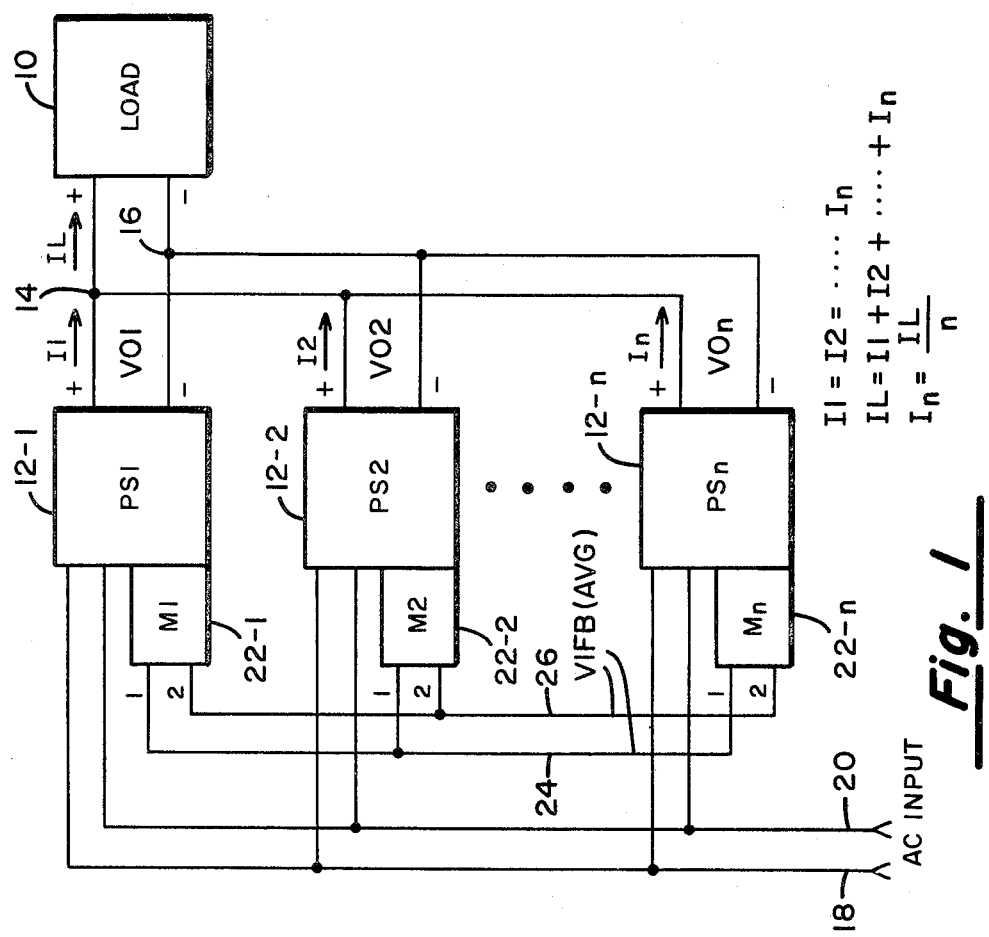
FIG. 1 is a block diagram of a system incorporating a plurality of power supplies coupled for driving a common load together with control circuitry to force the power supplies to share the load current equally.

FIG. 1 is a block diagram of a system incorporating a plurality of power supplies coupled for driving a common load together with control circuitry to force the power supplies to share the load current equally. It illustrates a load 10 driven by a plurality of power supplies. Each Power Supply, labeled 12-1, 12-2, and 12-n is identical with all other supplies. The output voltage across the + and − of each supply is a regulated DC voltage. The + line provides current from each supply to junction 14 which provides the load current IL to the Load 10. The − line of each supply is coupled to junction 16 and provides the common coupling to the Load. The load current IL is the sum of the supply currents I1+I2+In. The AC power input is provided to all of the supplies on lines 18 and 20. Each power supply has associated therewith a control circuit M, labeled 22-1, 22-2, and 22-n. Each of the control circuits M includes the circuitry for sensing the output current of its associated power supply and averaging the current supplied by all power supplies in the system. The common couplings provided by lines 24 and 26 are coupled respectively to the 1 and 2 terminals of each of the control circuits M. These common couplings provide an average voltage derived from the average current provided by each supply in the system designated VIFB (AVG). As will be described in more detail below, it is the function of the control circuits M to adjust the respectively associated Power Supply to produce less output current when it is determined that the sensed output current for that supply exceeds the average current provided by all supplies in the system.

Figure 2:
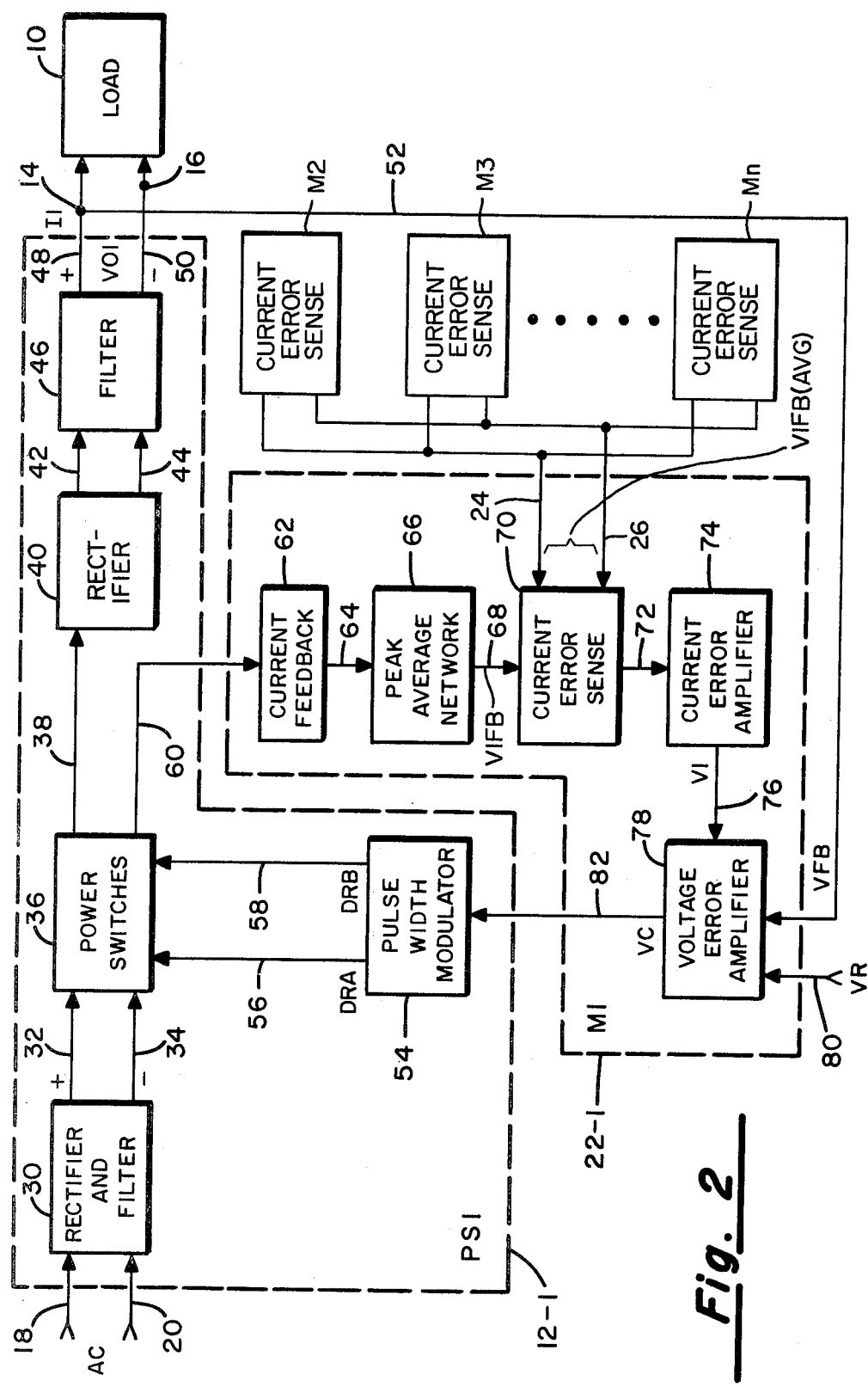
FIG. 2 is a block diagram of one power supply and its associated control circuitry for causing it to share load current equally in the system.

FIG. 2 is a block diagram of one power supply and its associated control circuitry for causing it to share load current equally in the system. Since each Power Supply 12 is the same as all other supplies, and each Control Circuit M is the same as all other control circuits, only one combined circuit will be described in detail. Power Supply-1 has been used as a reference, and is shown in block diagram form enclosed within dashed block 12-1. Similarly, the control circuitry associated therewith designated M1 is shown in block diagram form enclosed within dashed block 22-1. The Power Supply receives AC power on lines 18 and 20, which are respectively directed to the Rectifier and Filter 30. This circuitry provides high voltage unregulated DC power across lines 32 and 34. This unregulated power is applied to the Power Switches 36, which in turn provide signals on coupling line 38 to the Rectifier Circuit 40. The output from the Rectifier Circuit 40 is provided across lines 42 and 44 to the Filter 46, the output of which is provided on lines 48 and 50 to junctions 14 and 16 respectively. The current flow I1 on line 48 is the load current of the Power Supply that is provided to Load 10. The voltage between lines 48 and 50 is designated V01, and in this configuration also is provided on line 52 as a feedback path for providing feedback voltage VFB. For the configuration shown, the output voltage V01 is the same as VFB, but it should be understood that the feedback voltage VFB could be a scaled down fraction of the output voltage if so desired. A Pulse Width Modulator circuit 54 provides the Drive A signal DRA on line 56 and the Drive B signal DRB on line 58 to control the operation of the Power Switches 36, as will be described in more detail below. The Power Switches circuitry 36 also includes circuitry for sensing the current flow in the Power Supply and provides an indication of the current level on line 60.

The Control Circuitry M1 includes a Current Feedback circuit 62, and in response to the current levels sensed on line 60, provides a signal on line 64 to the Peak Average Network 66. It functions to rectify and average the peak values of a waveform that is proportional to the current flowing through the Power Switches 36. The signal resulting therefrom is provided on line 68 and is utilized in determining the sum of the currents being provided by other power supplies in the system. A Current Error Sense circuit 70 compares the current being provided by Power Supply 1 to the current being supplied by the other power supplies in the system by comparison of the voltage signal derived from the Peak Average Network 66 to the voltage VIFB (AVG) received on lines 24 and 26. When it is determined that the signal on line 68 is greater than that indicated by the signal on line 24, a signal is provided on line 72 to the Current Error Amplifier 74 thereby causing it to provide an output voltage V1 on line 76. The Voltage Error Amplifier circuitry 78 receives a reference voltage VR on line 80 in addition to the feedback voltage VFB on line 52. When the feedback voltage exceeds the referenced voltage VR, or when the output voltage V1 is present, the Voltage Error Amplifier 78 will provide a control voltage VC on line 82 which functions to control the operation of the Pulse Width Modulator 54. The signal on line 82 will result in the Pulse Width Modulator circuitry being adjusted such that the drive signals DRA and DRB will cause the Power Switches 36 to be operated at a lower duty cycle thereby resulting in a lower output current I1 to the Load. The reduction of the level of the output current I1 will continue until such time as it is sensed that the current being provided by Power Supply 1 is approximately equal that of the average of all power supplies in the system as indicated by the signal VIFB (AVG). The functional relationship of the circuits described in block diagram form will be illustrated and described in more detail below in logic and circuit schematic diagram representation.

FIG. 3 is a circuit and logic diagram and is a schematic illustration of a power supply and the control circuitry of the present invention. This circuit schematic diagram illustrates in detail an embodiment of the invention, as described in a block diagram form in FIG.

2. Circuit components are functionally identified and related to the block symbols previously described. There is illustrated a portion of the inverter power supply together with the control circuitry for effecting the forcing of equal load sharing. The unregulated high voltage DC provided from the Rectifier and Filter 30 is applied to circuit lines 32 and 34. The Power Switches are shown enclosed in dashed block 36 and include power transistors QSA and QSB, each of which comprises a power NPN transistor. The emitter electrodes are coupled in common to line 34. The collector electrodes are coupled to respectively associated ends of the primary winding of transformer T1. The base electrode of QSA is coupled to line 56 and the base electrode of QSB is coupled to line 58, for receiving the pulse width modulation control signals. The unregulated high voltage DC provided on line 32 is coupled to one end of the primary winding of current sampling tansformer T2, with the other end of the primary winding being coupled to the center tap of the primary winding of coupling transformer T1. The signals generated by the Power Switches are coupled to the secondary winding of coupling transformer T1, which in turn is coupled to the Rectifier Circuit shown enclosed in dashed block 40. This Rectifier Circuit is preferably comprised of a pair of diodes DB1 and DB2, each of which has an anode terminal coupled to its respectively associated end of the secondary winding and which have its cathode terminals coupled in common to line 42. The center tap of the secondary winding is coupled to line 44. FIG. 3A shows a schematic of a bridge rectifier circuit which may be alternatively substituted for the rectifier 40. Note that in this configuration a center tapped secondary of transformer $T_1$ is not required. The circuit may also be adapted to use a full-wave bridge rectifier as shown in FIG. 3A. The Filter is shown enclosed in dashed block 46 and comprised of Inductor L1 and Capacitor C. The regulated DC output voltage is provided across lines 48 and 50, with the feedback voltage VFB derived from circuit junction 14 on line 52.

The Pulse Width Modulator logic circuitry is shown enclosed in dashed block 54. It includes a clock 90 that provides a source of regularly occurring clock pulses on line 92 for driving Toggle Flip Flop circuit 94 and Mono-stable circuit 96. The Toggle Flip Flop functions to provide a true output signal Q on line 98 and a complement signal $\overline{Q}$ on line 100 for one clock cycle, and then reverses the signals on lines 98 and 100 on the next subsequent clock cycle. The Mono-stable circuit 96 provides an output signal W on lines 102 to 102-1, and defines the duration or width W of the control signals that will activate the Power Switches, thereby defining their respective duty cycles. AND circuit 104 receives input signals from lines 98 and 100 and provides an output signal DRA to line 56. AND circuit 106 receives input signals from lines 100 and 102-1 and provides an output signal DRB to line 58. The duration of the W signal provided by the Mono-stable circuit 96 will be determined by the control signal provided on line 82.

Figure 4:
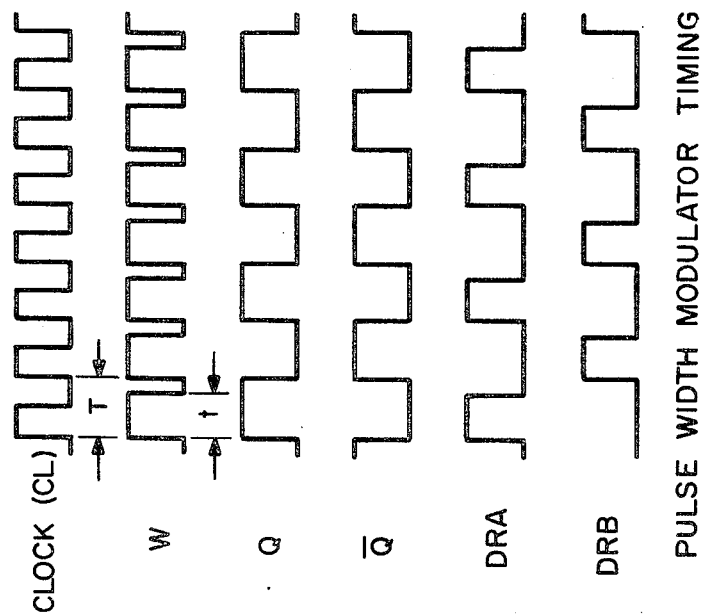
FIG. 4 is a timing diagram of the pulse-width-modulator logic.

The functioning of the Pulse Width Modulator circuitry can be further understood by consideration of the timing diagram illustrated in FIG. 4. The Clock signal has a clock cycle time T. The Clock signal defines regularly occurring signals Q and $\overline{Q}$. The duty cycle defining signal W has a varying duration t determined by the control signals. The signal W in conjunction with the signal Q determines the duration of the Drive A signal DRA, and the W signal in conjunction with the $\overline{Q}$ signal determines the duration of the Drive B signal DRB.

The logic circuits that comprise the Pulse Width Modulator circuitry 54 are logic circuits that are well known and are available commercially, and will not be described in detail as to their electrical function, it being understood by those skilled in the art that the logical function described the operation within the circuit.

Returning to a consideration of FIG. 3, the Control Circuitry M that embodies the subject invention will be described in detail. The Current Feedback is shown enclosed in dashed block 62 and comprises current sampling Transformer T2. The secondary winding of Transformer T2 has one terminal coupled to line 26 and the other terminal of the secondary winding coupled to line 64 for providing the current feedback signal to the Peak Average Network shown enclosed in dashed block 66. This Network includes Diode D1 whose anode terminal is coupled to line 64 and whose cathode terminal is coupled to junction 110. Capacitor C1 is coupled across junction 110 and common line 26. Junction 110 is coupled by line 112 to junction 114. Resistor R1 is coupled between junction 114 and line 26.

Transformer T2 is a current sensing transformer of the type available commercially, and characteristically has a turns ratio of 50 to 1. The primary of Transformer T2 senses the current signals resulting from the operations of Switching Transistors QSA and QSB. The signal generated in the secondary is provided to Network 66 which functions to peak rectify and average the peak values of the waveforms sensed. When Diode D1 is forward biased, a charge will be imposed on Capacitor C1. Resistor R1 provides a discharge path for Capacitor C1 and results in a signal VIFB at junction 114. In the preferred embodiment, Capacitor C1 is characteristically 0.1 microfarads and Resister R1 is characteristically 10,000 ohms. The signal provided on line 68 to the Current Error Sense circuitry, shown enclosed within dashed block 70 essentially is compared to the VIFB (AVG) signal received on line 24. It includes a summing Resistor R2. If Power Supply 1 is providing more load current than other power supplies in the system, the signal VIFB will be greater in value than the signal VIFB (AVG), and there will be a voltage differential VΔI, such that the signal level on line 72a will have a value greater than the signal level on line 72b. Resistor R2 has a value of 100,000 ohms for this embodiment. A signal representing the average load current output of all of the power is derived as shown in FIGS. 2 and 3. The output VIFB of each peak average network 66 is connected to a common pair of buses 24, 26 through series resistor $R_2$ of network 70. The bus thus serves as a summing junction to provide a voltage signal VIFB (AVG) that is the average of the peak detected by all peak detectors for modules $M_1, M_2, \ldots, M_n$, and represents the average load current, i.e., the average of the collector current delivered by transistor QSA and QSB of all inverters to the load 10 through the output transformer $T_1$. This average signal serves as a reference for each of the difference amplifiers $A_1$ for comparison with the individul module current.

The Current Error Amplifier shown enclosed in dashed block 74 is comprises of Operational Amplifier A1 together with compensation network elements including Resistor R3, Capacitor C2 and Resistor R4. Operational Amplifier can be a type LM324 circuit available commercially and has its plus terminal coupled to line 72b. Resistor R3 has one terminal coupled to line 72a and its other terminal coupled to junction 116 which in turn is coupled to the - input of Operational Amplifier A1. The output of the Operational Amplifier is coupled to junction 118. Capacitor C2 has one terminal coupled to junction 116 and its other terminal coupled to Resistor R4, with the second terminal of R4 coupled to junction 118. Resistor R3 has a value of one megohm and R4 has a value of 100,000 ohms. Capacitor C2 has a value of 0.1 microfarads. As long as the signals VIFB and VIFB (AVG) are essentially balanced, the Operational Amplifier A1 output V1 will remain high and will reverse bias diode D2 which has its cathode terminal coupled via line 76 to junction 118. When VIFB is greater than VIFB (AVG), the positive voltage differential across Resistor R2 will provide a signal imbalance on line 72a and 72b which will result in the Operational Amplifier A1 to have its output signal V1 tending to go low, thereby forward biasing Diode D2. Thus it can be seen that Operational Amplifier A1 only affects the power supply operation when the power supply current exceeds its share of the load, since in all other cases Diode D2 will be reversed biased and effectively blocks any feedback effect to the Pulse Width Modulator circuitry with regard to the sensed current levels.

The Voltage Error Amplifier is shown enclosed in dashed block 78. It includes Operational Amplifier A2 which can be a type LM324 circuit. The anode terminal of Diode D2 is coupled through Resistor R5 to junction 120. The Reference Voltage VR is coupled via line 80 through Resistor R6 to junction 120, which in turn is coupled to the + input terminal of A2. The feedback voltage VFB is coupled via line 52 through Resistor R7 to junction 122 and provided to the − input of A2. The output terminal of Operational Amplifier A2 is coupled to junction 124. The compensation network comprised of Resistor R8 and Capacitor C3 is coupled in series between junctions 122 and 124, for this embodiment Resistors R5, R6, R7, and R8 are each 10,000 ohms and Capacitor C3 is 0.1 microfarads. When voltage V1 tends to go low and Diode D2 is forward biased, as a result of the sensed imbalance of current supplied by the power supply, it results in a decrease in the reference input to the plus terminal of Operational Amplifier A2, as compared to the feedback voltage VFB, and causes A2 to drive its output control voltage VC low thereby controlling the Mono-stable circuit 96 to shorten the duration of its output pulses W, thereby decreasing the duty cycle of the Power Switches. When Diode D2 is reversed biased, A2 will compare the reference voltage VR to the feedback voltage VFB and adjust duty cycle to maintain a regulated output voltage.

The circuit described in detail can characteristically respond to an AC input of 65 to 250 volts AC and at frequencies of 50 to 400 Hertz. The system can be designed to provide regulated output to the Load for each power supply of different levels. While different levels can be provided, the embodiment described would typically provide a value of V01 of 5 volts DC. In this configuration, the feedback voltage VFB is equal the output voltage and would be nominally 5 volts. Similarly for the voltage resulting from the current sense circuitry would provide a voltage VIFB of 5 volts. The average sensed voltage of all power supplies in the system VIFB (AVG) would also be typically 5 volts. The difference of voltage V∆I occurring across Resistor R2 would approach zero in the balanced state and would only show a voltage differential when a power supply was supplying an unbalanced portion of the current to the load. The reference voltage VR would be matched to the output voltage and would be typically 5 volts for this embodiment. The control voltages V1 and VC would be variable, and would have movement upward or downward depending upon the balance conditions of the Operational Amplifiers A1 and A2 respectively. It is of course apparent to those skilled in the art that power supplies providing different output voltage levels can be designed without departing from the scope and spirit of the invention.

It can be seen from the foregoing detail description of a preferred embodiment that the objects and purposes of the invention have been achieved. Various changes and modifications in the circuit of the preferred embodiment will be apparent to those skilled in the art, and without departing from the spirit of the invention, what is intended to be protected by Letters Patent as set forth in the appended claims.

What is claimed is:

1. In a power supply for use with electronic equipment of the class having input means for coupling to a source of power; a plurality of power supply means coupled to said input means and each having output means coupled in common for providing current to common load; average output summing means for providing average output signals indicative of the average load current output of all of said power supply means to the load; a plurality of control circuit means each coupled to a respectively associated one of said plurality of power supply means for forcing said associated power supply to provide load current substantially equal to the load current provided by each of the other ones of said plurality of power supplies; wherein each of said plurality of power supply means includes power switch means capable of variable duty cycle operation for providing power signals to be utilized in determining said current to said common load pulse width modulation means coupled to said power switch means for adjusting said duty cycle in response to said control signals, thereby adjusting and controlling the level of said current supplied to said common load; and wherein each of said control circuit means includes power supply output level sensing means for providing output level signals indicative of the output level of the associated one of said power supply means to the common load, comparison means for comparing said output level signals to said average output signals for providing control signals when said output level signals have a predetermined relationship to said average output signals, and power supply adjustment means responsive to said control signals for adjusting the output level of the associated one of said power supply means in response thereto, thereby substantially equalizing the load current provided by each of said power supply means; said power supply output level sensing means includes current transformer means coupled to said power switch means for providing feedback current signals indicative of the load current supplied from said power switch means and peak average network means for integrating said current feedback signals and providing said output level signals as comparison voltage levels indicative of said feedback current levels; wherein said comparison means further comprises current error sense means coupled to said peak average network means and having average output receiving means for receiving said average output signals for providing error sense signals when said comparison voltage levels exceed said average output signals; and current error amplifier means coupled to said current error sense means for providing current error indicating signals indicative of the level of comparison of said output level signals to said average output signals in response to said error sense signals.

2. A power supply system as in claim 1 wherein said power supply adjustment means includes voltage error amplifier means having first input means for receiving a reference voltage, second input means for receiving a feedback voltage indicative of the voltage applied to the load, and third input means for receiving said current error indicating signals from said current amplifier means, for providing said control signals to said pulse width modulation means when said feedback voltage differs from said reference voltage and when said current error indicating signals differ from said feedback voltage.

3. A power supply system as in claim 2 wherein said power supply adjustment means further includes blocking means for blocking the effect of said current error indicating signals when said comparison voltage levels are equal to and less than said average output signals.

4. For use in a power supply system having a plurality of power supplies coupled to supply a common load, each power supply having an associated control circuit for causing it to share the load current generation substantially equally with all other power supplies in the system, each power supply and control circuit in combination comprising:

input means for coupling to a source of unregulated DC power;

power switch means capable of variable duty cycle operation for providing power signals;

pulse width modulation means coupled to said power switch means for adjusting said duty cycle in response to variable control signals;

coupling transformer means having primary means coupled to said power switch means, and secondary means for providing bidirectional signals;

rectifier means coupled to said secondary means;

common junction means for coupling to a load;

filter means coupled to said rectifier means and said common junction means for providing DC output levels to the load.

current transformer means coupled to said power switch means for providing feedback current signals indicative of the load current supplied by said power switch means;

peak average network means for integrating said current feedback signals and providing comparison voltage signals indicative of said feedback current levels;

average output means for receiving average output signals of the other power supplies indicative of the average load current levels supplied;

current error sense means coupled to said peak average network means and said average output means for comparing said comparison voltage signals to the average output signals of the other power supplies in the system and providing error sense signals when they differ;

current error amplifier means coupled to said current error sense means for providing current error indicating signals indicative of the level of comparison of said comparison voltage signals to said average output signals in response to said error sense signals;

output voltage feedback means coupled to said common junction means for providing feedback voltage;

voltage error amplifier means having first input means coupled to said output voltage feedback means, second input means coupled to said current amplifier means, and third input means for receiving a reference voltage, for providing said control signals to said pulse width modulator means for adjusting said duty cycle when said reference voltage and said current error indicating signals differ from said feedback voltage.

5. A power supply and control circuit combination as in claim 9 wherein said current transformer means includes secondary winding means having one secondary terminal coupled to common line means and a second secondary winding terminal; and said peak average network means includes first diode means having a first diode terminal coupled to said second secondary terminal and a second diode terminal coupled to said current error sense means, first capacitor means and first resistor means each coupled across said common line and said second diode terminal.

6. A power supply and control circuit combination as in claim 5 wherein said current error sense means includes second resistor means coupled intermediate said second diode terminal and said average output means for providing said error sense signals when said comparison voltage signals exceed said average output signals.

7. A power supply and control circuit combination as in claim 6 wherein said current error amplifier means includes third resistor means having a first terminal coupled to said second diode terminal and a second resistor terminal;

first operational amplifier means having an output terminal, a first input terminal coupled to said average output means and a second input terminal coupled to said second resistor terminal of said third resistor means, for providing said current error indicating signals as a varying voltage level V1 at said output terminal thereof in response to said error sense signals.

8. A power supply and control circuit as in claim 7 and further including second diode means coupled intermediate said output terminal of said first operational amplifier means and said voltage error amplifier means for causing said voltage error amplifier means to provide said output signals as variable control voltages VC in response to said varying voltage level V1 when the power supply is providing more than the average current, and for blocking the feedback effect of said varying voltage level V1 when the power supply is providing less than the average load current.

9. A power supply and control circuit combination as in claim 8 wherein said voltage amplifier means includes second operational amplifier means for providing said variable control voltage VC when said feedback output voltage differs from the reference voltage, and when said comparison voltage signals are greater than said average output signals.

10. A power supply as set forth in claim 4, wherein said rectifier means comprises full-wave rectifier means.

11. A power supply as set forth in claim 10, said rectifier means further comprising full-wave bridge rectifier means.

* * * * *